United States Patent
Yeo et al.

(10) Patent No.: US 7,190,542 B2
(45) Date of Patent: Mar. 13, 2007

(54) ACOUSTICAL NOISE REDUCTION FOR A DATA STORAGE DEVICE

(75) Inventors: KianSoon Yeo, Singapore (SG); JiaHong Shu, Singapore (SG); JackMing Teng, Singapore (SG); KianKeong Ooi, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 476 days.

(21) Appl. No.: 10/783,818

(22) Filed: Feb. 20, 2004

(65) Prior Publication Data

US 2005/0046992 A1 Mar. 3, 2005

Related U.S. Application Data

(60) Provisional application No. 60/494,822, filed on Aug. 13, 2003.

(51) Int. Cl.
- *G11B 15/18* (2006.01)
- *G11B 17/00* (2006.01)
- *G11B 19/02* (2006.01)
- *G11B 21/02* (2006.01)

(52) U.S. Cl. .......................................... 360/69; 360/75
(58) Field of Classification Search ...................... None
See application file for complete search history.

(56) References Cited

U.S. PATENT DOCUMENTS

| | | | |
|---|---|---|---|
| 5,128,813 A | | 7/1992 | Lee |
| 6,078,455 A | | 6/2000 | Enarson et al. |
| 6,169,930 B1 | * | 1/2001 | Blachek et al. ............... 700/79 |
| 6,188,191 B1 | | 2/2001 | Frees et al. |
| 6,212,027 B1 | | 4/2001 | Lee et al. |
| 6,252,364 B1 | * | 6/2001 | Chiang et al. ............... 318/280 |
| 6,266,203 B1 | | 7/2001 | Street et al. |
| 6,282,038 B1 | | 8/2001 | Bonaccio et al. |
| 6,342,985 B1 | | 1/2002 | Clare et al. |
| 2001/0026414 A1 | | 10/2001 | Shibata |

\* cited by examiner

*Primary Examiner*—William Korzuch
*Assistant Examiner*—Daniell L. Negrón
(74) *Attorney, Agent, or Firm*—Derek J. Berger (57) ABSTRACT

A method, apparatus, and combination for reducing acoustical noise at start-up of a device is disclosed. The method includes the steps of determining an internal temperature of the device, and unlatching an actuator of the device based on the determined internal temperature of the device, by steps for unlatching the actuator of the device. The apparatus includes a thermistor providing a resistance value to a controller that selects an unlatch process based on the resistance value of the thermistor, and an unlatch procedure programmed into the controller executing the selected unlatch process. The device combination includes a base deck supporting an actuator confined by a magnetic latch for periods of inactivity, and unlatched from the magnetic latch for periods of activity by steps for unlatching the actuator.

16 Claims, 5 Drawing Sheets

ACOUSTICAL NOISE REDUCTION FOR A DATA STORAGE DEVICE

RELATED APPLICATIONS

This application claims priority to U.S. Provisional Application No. 60/494,822 filed Aug. 13, 2003, entitled Temperature Compensated VCM Driver Unlatch Algorithm to Improve Acoustic.

FIELD OF THE INVENTION

This invention relates generally to the field of data storage devices, and more particularly, but not by way of limitation, to incorporation of an acoustical noise reduction apparatus and method for an actuator of a data storage device.

BACKGROUND

One key component of many electronic systems is a device, such as a data storage device (DSD) to store and retrieve large amounts of user data in a fast and efficient manner. One method in which DSDs store digital data is in magnetic form on recording surfaces of one or more rigid data storage discs affixed to a spindle motor for rotation at a constant high speed.

Transducing heads aerodynamically supported over the recording surfaces by fluidic currents established by the rotation of the discs are controllably positioned by an actuator to read data from and write data to tracks defined on the recording surfaces. An outer framework that includes a base deck and top cover form an internal sealed compartment for housing mechanically operational components of the DSD. The base deck is essentially a platform to which DSD components, such as a disc stack assembly and the actuator are secured, and is of a size and shape to engage the electronic system. The top cover cooperates with the base deck to substantially seal the mechanically operational components of the DSD from external environments.

A major challenge for DSDs designs and designers is to limit and mitigate acoustical noise during start-up and active operating modes of the DSD. One source of acoustical noise occurs at start-up of the DSD as a result of unlatching the actuator in preparation for data exchange operations between each head and disc combination of the DSD. A reduction in the level of noise experienced by the DSD at start-up aids in compliance with acoustical noise limit specifications of the DSD.

As such, challenges remain and a need persists for improvements in methods and apparatus to mitigate acoustical noise of the actuator assembly of a DSD that disadvantageously erodes compliance with acoustical noise limit specifications of the DSD.

SUMMARY OF THE INVENTION

The present invention provides an economical method, apparatus, and combination for reducing acoustical noise during start-up activities of a data storage device through incorporation of a thermistor within an internal portion of the data storage device. In a preferred embodiment, the internal portion of the data storage device is an internal portion of a head-disc assembly of the data storage device. More specifically, the thermistor is supported by a flex circuit, which is attached to an actuator of the head-disc assembly of the preferred embodiment.

Preferably, a resistance value of the thermistor changes in response to the temperature surrounding the thermistor. The resistance value of the thermistor is compared by a controller to a predetermined temperature threshold value. The controller communicates with the thermistor via the flex circuit. Based on the comparison, the controller selects an unlatch process to unlatch an actuator of the head-disc assembly, while reducing the acoustical noise associated with unlatching the actuator.

In a preferred embodiment the method includes the steps of determining an internal temperature of the device based on the resistance value of the thermistor, and unlatching the actuator based on the determined internal temperature of the device.

Preferably, the apparatus includes the thermistor providing the resistance value to the controller, which selects an unlatch process based on the resistance value of the thermistor, and an unlatch procedure programmed into the controller executing the selected unlatch process.

Preferentially, the data storage device combination includes a base deck supporting the actuator confined by a magnetic latch for periods of inactivity of the data storage device, and unlatched from the magnetic latch for periods of activity of the data storage device by steps for unlatching the actuator.

These and various other features and advantages, which characterize the present invention, will be apparent from a reading of the following detailed description and a review of the associated drawings.

DETAILED DESCRIPTION

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
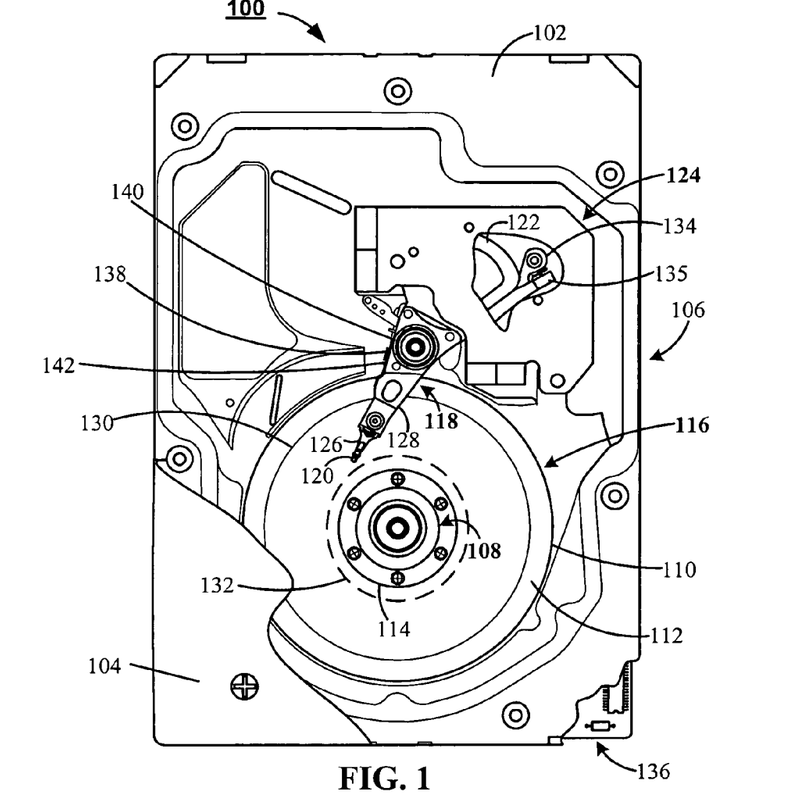
FIG. 1 is a top plan view of a disc drive incorporating a temperature dependent, unlatch apparatus and algorithm for unlatching a magnetic latch of the disc drive in accordance with a method of the present invention.

Referring to the drawings, FIG. 1 provides a top plan view of a data storage device (DSD) 100. The DSD 100 includes a base deck 102 cooperating with a top cover 104 (shown in partial cutaway) to form a sealed housing for a mechanical portion of the DSD 100, referred to as a head-disc assembly (HDA) 106.

A spindle motor assembly 108 (also referred to as a motor 108) rotates a number of data storage discs (disc or discs) 110 with a magnetic recording surface (surfaces) 112 at a substantially constant operational speed. Each disc 110 includes at least one magnetic recording surface 112. The discs 110 are secured to the motor 108 by a disc clamp 114 to form a disc stack assembly 116.

A rotary actuator (actuator) 118 supports and rotates a number of read/write heads (head or heads) 120 adjacent the surfaces 112 when current is applied to a voice coil (coil) 122 of a voice coil motor (VCM) 124. The heads 120 are secured to a suspension 126, which is attached to an actuator arm 128 of the actuator 118. The suspension 126 assures that a consistent, predetermined spring force is applied to each head 120 for proper control of the heads 120 relative to the discs 110.

During operation of the DSD 100, the actuator 118 moves the heads 120 to data tracks 130 (one shown) on the surfaces 112 to write data to, and read data from the discs 110. When the DSD 100 is deactivated, the actuator 118 moves the heads 120 to a predetermined position. For example, the actuator 118 may position the heads 120 adjacent a home position 132, and utilize a magnetic latch 134 to constrain motion of the actuator 118 adjacent a bumper 135. However, alternative means for restraining the actuator 118 may be employed, for example, a ramp load/unload mechanism (not shown), or a toggle latch (also not shown) may be incorporated to constrain movement of the actuator 118 during periods of inactivity of the DSD 100.

During data transfer operations of the DSD 100; the heads 120 transfer data to and from the surfaces 112 to a printed circuit board assembly 136. The data are processed by a preamplifier 138 and passed to the printed circuit board assembly 136 through a flex circuit 140. Movement of the heads 120 from a first selected data track 130 to a second selected data track 130 is referred to as executing a seek operation.

During start-up operations of the DSD 100; current applied to the coil 122 imparts energy into the actuator 118 to unlatch the actuator from the magnetic latch 134. In a preferred embodiment, the amount of energy imparted to the actuator 118 varies with the internal temperature of the HDA 106, and the type of current (alternating current AC, or direct current DC) provided to the coil 122. The internal temperature of the HDA 106 is determined through use of a thermistor 142 (a thermally sensitive resistor that has, according to type, a negative (NTC), or positive (PTC) resistance/temperature coefficient) mounted to the flex circuit 140.

If the internal temperature of the HDA 106 is determined to be above an empirically determined temperature threshold, a level of direct current (DC) is preferably selected and applied for an initial predetermined interval of time across the coil 122. Both the current level and the interval of time for application of the DC current level to the coil 122 may be sequentially altered during the unlatch process. If both a maximum DC current level and a maximum time interval for application of the DC current to the coil 122 has been attained, and the process of unlatching the magnetic latch has been unsuccessful, or if the internal temperature of the HDA 106 is determined to be below the empirically determined temperature threshold an alternating current (AC) unlatch process is initiated.

The AC current employed by the AC current unlatch process is not limited to a sinusoidal waveform, i.e., a saw-tooth, square, or combination waveform may be selected for use as the waveform of choice during execution of the AC current unlatch process. Preferably, the AC current unlatch process commences with an application of an AC current level applied across the coil 122 for a predetermined period of time. If the actuator 118 has not been successfully unlatched, the AC current level, used by the AC current unlatch process, is sequentially increased in an attempt to unlatch the magnetic latch 134 and free the actuator 118. If a maximum current level for use during the AC current unlatch process has been achieved, and the actuator 118 remains latched, an actuator unlatch failure is reported.

Both the AC current unlatch process and the DC current unlatch process employ monitoring of the Back EMF (Bemf) response of the coil to determine whether or not the magnetic latch 134 has released the actuator 118. In each case, the supply of the current to the coil 122 is suspended to float the actuator 118, while the voltage level of the coil 122 resulting from the Bemf is sensed.

In executing either the AC or DC current unlatch process it has been found useful to establish a maximum current level and the duration that may be employed to overcome the magnetic force of the magnetic latch 134, without incurring a "slam" (an undesirable and disadvantageous excessively forceful interaction of the actuator 118 with a crash stop (not shown)).

Preferably, for the DC current unlatch process, the maximum current level and the duration of its application that may be employed to overcome the magnetic force of the magnetic latch 134, without incurring a "slam," is empirically determined for each DSD 100 of interest. The maximum current determination is based on the lowest magnetic latch force specified for the DSD 100 of interest, and a maximum unlatch time limit specified for the DSD 100 of interest. For example, measurements are made to find a minimum drive current that will result in a slam of the actuator 118 of the DSD 100 of interest, when that minimum drive current is applied for a maximum time within the specified maximum unlatch time.

However, as one skilled in the art will recognize, variations on the desired amount of time to be used for executing the DC current unlatch process will result in a different minimum current level that will result in a slam. In other words, the shorter the duration of time made available for unlatching the actuator 118 from the magnetic latch 134, the greater will be the level of DC current needed to induce a slam. The longer the duration of time made available for unlatching the actuator 118 from the magnetic latch 134, the less will be the level of DC current needed to induce a slam. For purposes of disclosure and enhancing an understanding of the present invention, and not by way of imposing limitations on the present invention, the minimum drive current that will result in a slam of the actuator 118 of the DSD 100 of interest, when applied for a maximum time within the specified maximum unlatch time will be employed in describing a preferred embodiment of the present invention.

Figure 2:
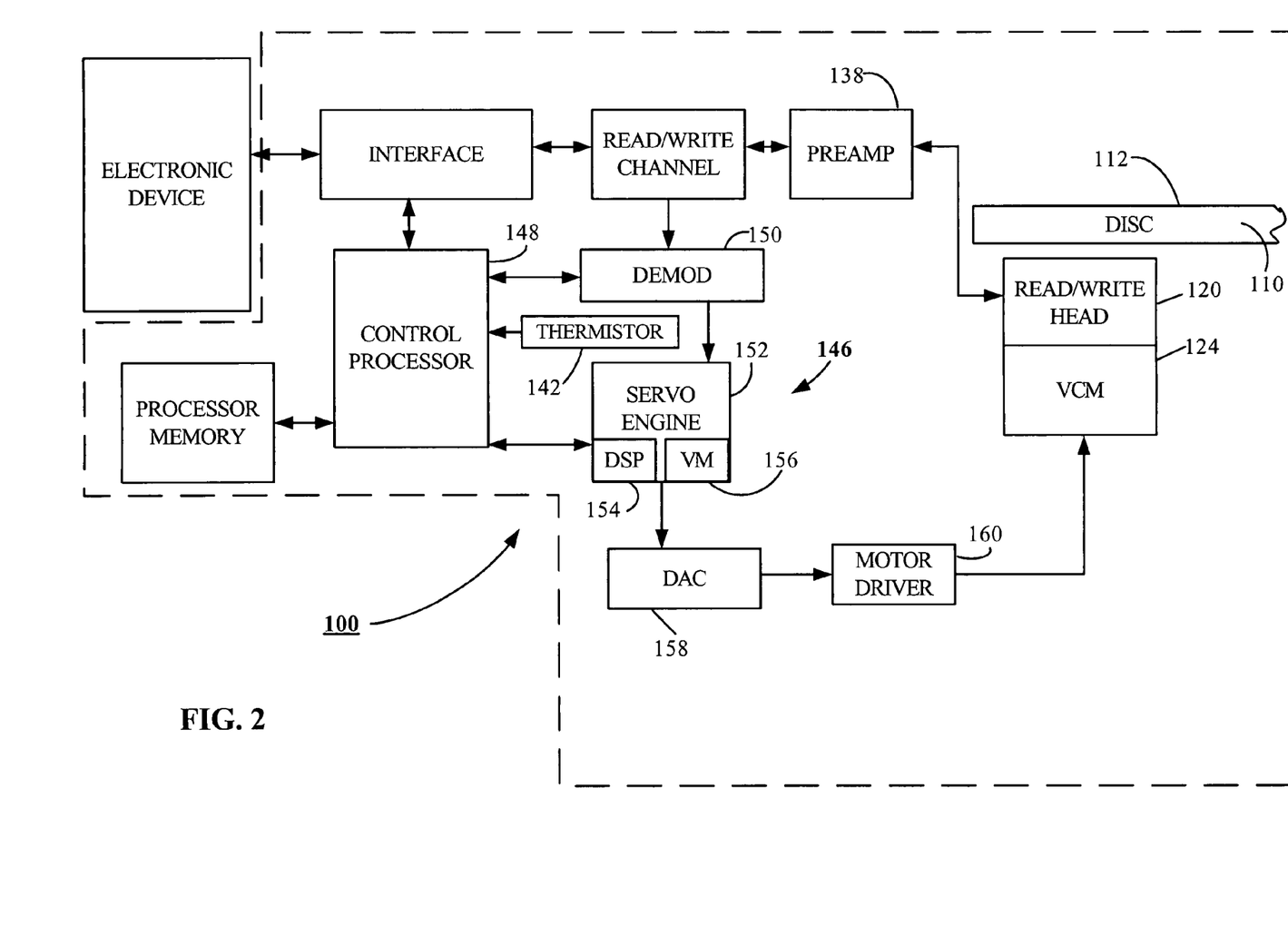
FIG. 2 is a functional block diagram of control circuitry of the disc drive of FIG. 1.

Turning to FIG. 2, the term "servoing," also referred to as position-controlling, as used herein means maintaining control of the head 120 (of FIG. 1) relative to the selected data track 130 (of FIG. 1) during operation of the DSD 100, either during seek operations or track following operations. When servoing to or on the data track 130, the head 120 is controllably positioned by the VCM 124. Position-controlling of the head 120 is provided by the actuator 118 (of FIG. 1) responding to the VCM 124 operating under the control of a servo control circuit 146 programmed with servo control code, which forms the servo control loop. The servo control circuit 146 includes a control processor (controller) 148, a demodulator (demod) 150, may include an application specific integrated circuit (ASIC) hardware-based servo controller ("servo engine") 152, may include a digital signal processor (DSP) 154, and includes volatile memory (VM) 156, a digital to analog converter (DAC) 158, and a motor driver circuit 160. Optionally, the functions of the servo engine 152, the DSP 154, and the VM 156 may all be contained within the controller 148. The components of the servo control circuit 146 are utilized to facilitate track following algorithms for the actuator 118, and more specifically for controlling the VCM 124 in position-controlling the heads 120 relative to the selected data track 130.

The demod 150 conditions head position control information transduced from the surfaces 112 (of FIG. 1) to provide position information of the head 120 relative to the data track 130. The servo engine 152 generates servo control loop values used by the controller 148 in generating command signals such as seek signals used by the VCM 124 in executing seek commands, and to maintain a predetermined position of the actuator 118 during data transfer operations. The command signals generated by the controller 148 are converted by the DAC 158 to analog control signals for use by the motor driver circuit 160 in position-controlling the head 120 relative to the selected data track 130, for track following, and relative to the surfaces 112 for track to track seek functions.

In a preferred embodiment, during spin-up of the surfaces 112, the controller 148 determines an internal temperature of the HDA 106 (of FIG. 1) by referencing a resistance of the thermistor 142. Based on the determined internal temperature, the controller 148 instructs the motor driver circuit 160 to apply either a DC unlatch current waveform, or an AC unlatch current waveform to the VCM 124 to unlatch the actuator 118 from the magnetic latch 134. The temperature value at which the controller 148 determines which unlatch current waveform will be employed is a predetermined temperature threshold value.

The temperature threshold value for each type of DSD 100 may vary from DSD type to DSD type. However, what has been found is that the amount of force needed to unlatch the actuator 118 from its magnetic latch 134 decreases as the temperature within the HDA 106 increases, and that the response of the magnetic latch 134 to variations in temperature is substantially common between HDAs 106 within each type of DSD 100.

In a preferred embodiment, the temperature threshold value for a DSD 100 of interest is empirically determined by finding the minimum drive current for the DC unlatch current waveform (min. current) that, when applied for a maximum time within the specified maximum unlatch time (max. interval), will result in a slam of the actuator 118 when the internal temperature of the HDA 106 is in a temperature range of about 20–23° C. While holding the current level to the min. current for the max. interval, the internal temperature of the HDA 106 is sequentially reduced to a point that the min. current at the max. interval is ineffective in unlatching the actuator 118.

When the temperature has been identified at which the min. current supplied to the coil 122 (of FIG. 1) over the max. interval is ineffective in unlatching the actuator 118, a margin of a few degrees (2–4° C.) is added to the identified temperature to establish a threshold temperature. The internal temperature of the HDA 106 is moved to be substantially the threshold temperature, and the resistance value of the thermistor 142 is measured to establish the temperature threshold value.

Figure 3:
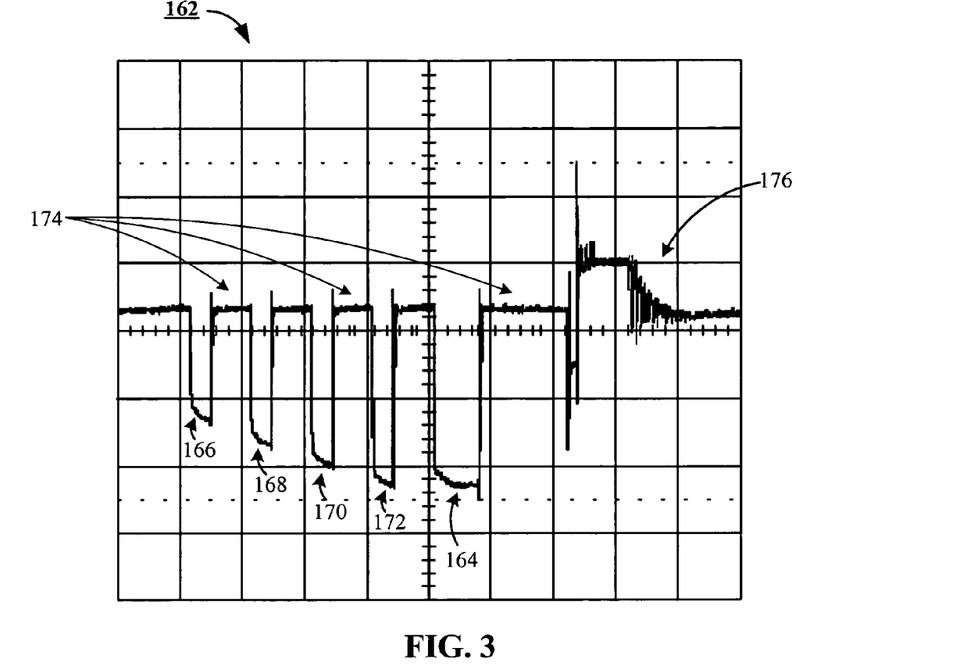
FIG. 3 is a graph showing a DC unlatch current profile used by a DC current unlatch process for unlatching the magnetic latch of the disc drive of FIG. 1.

FIG. 3 shows a DC current profile 162; of a preferred embodiment of the DC current unlatch process. A minimum current applied for a maximum time interval to effectively unlatch the actuator 118 (of FIG. 1), i.e., profile portion 164, is arrived at following a sequence of prior applied increasing levels of current. Each level of current is applied for a predetermined period of time (shown by profile portions 166, 168, 170 and 172). In a preferred embodiment, the drive current for each of the profile portions has been applied to the coil 122 for substantially the same time interval. Once a maximum level for the minimum current (MLMC) is arrived at (profile portion 172), the interval of time used for application of the MLMC to the coil 122 is sequentially increased to a max. interval.

It is noted that each profile portion of the DC current profile 162 is separated by a Bemf measurement period 174, during which the Bemf of the coil 122 is measured to detect a VCM sense voltage response 176. If the actuator 118 fails to become unlatched from the magnetic latch 134 once the MLMC has been applied for the maximum time interval, the DC current unlatch process is halted and an AC current unlatch process is initiated.

Figure 4:
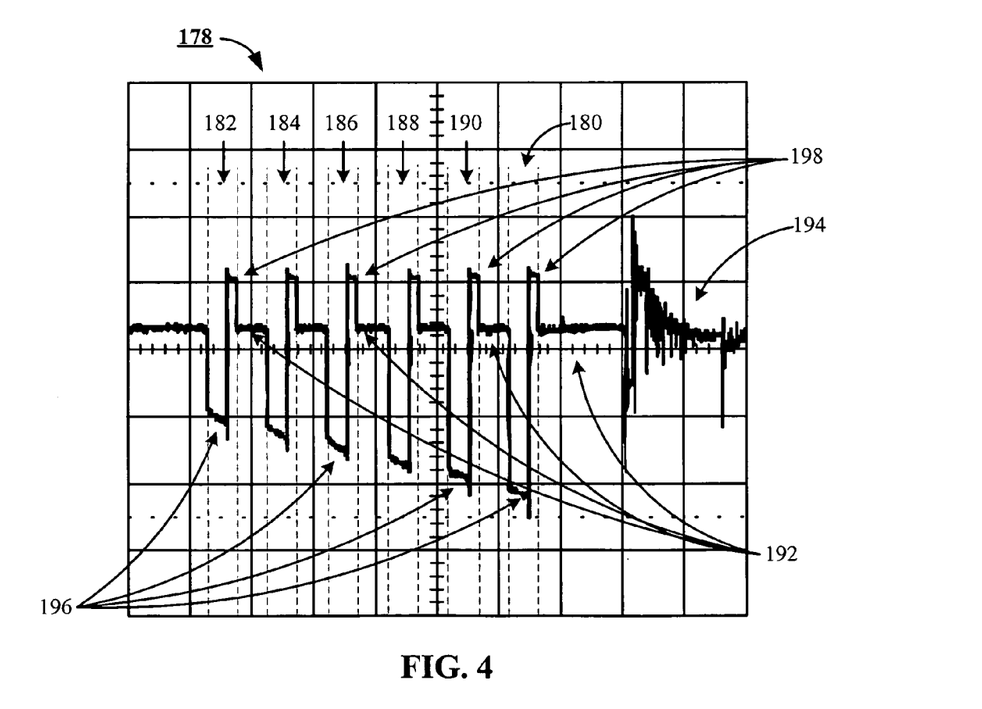
FIG. 4 is a graph showing an AC unlatch current profile used by an AC current unlatch process for unlatching the magnetic latch of the disc drive of FIG. 1.

FIG. 4 shows an AC current profile 178; of a preferred embodiment of the AC current unlatch process. In applying current to the coil 122 (of FIG. 1), a maximum current applied for a predetermined time interval to effectively unlatch the actuator 118 (of FIG. 1), profile portion 180, is arrived at following a sequence of prior applied increasing levels of current (shown by profile portions 182, 184, 186, 188 and 190). Each of the increasing current levels is applied for the predetermined period of time. In a preferred embodiment, the drive current for each of the profile portions has been applied to the coil 122 for substantially the same time interval. If following application of a maximum current to the coil 122 (profile portion 180) the actuator 118 is not unlatched from the magnetic latch 134 (of FIG. 1), a "failure to unlatch error" is reported.

It is noted that each profile portion of the AC current profile 178 is separated by a Bemf measurement period 192, during which the Bemf of the coil 122 is measured to detect a VCM sense voltage response 194. If the actuator 118 fails to become unlatched from the magnetic latch 134 following an application of the maximum current across the coil 122 for the predetermined period of time, the VCM sense voltage response 194 will not occur and the AC current unlatch process will report a "failure to unlatch error."

It is also noted that each profile portion (180 through 190) of the AC current profile 178 includes an acceleration state 196 and a deceleration state 198. It is further noted that in a preferred embodiment, both the DC current profile 162 (of FIG. 3) and the AC current profile 178 (of FIG. 4) are driven at a voltage level of substantially 6.65 volts. Because the AC current profile 178 includes both the acceleration state 196 and the deceleration state 198, the current to the coil 122 (of FIG. 1) is applied in an alternating direction to simulate an empirically determined resonance frequency to excite the bumper 135 (of FIG. 1). By simulating the empirically determined resonance frequency with the AC current profile 178 during the AC current unlatching process, the actuator 118 (of FIG. 1) is more easily moved from the latched position as opposed to movement of the actuator 118 from the latched position through the use of the DC current unlatching process. The level of current used during the DC current unlatching process is substantially the same level of current used during the AC current unlatching process. However, the current applied during DC current unlatching process is applied in one direction only as opposed to the bidirectional application of the current during the AC current unlatching process. It is noted, that use of the simulated AC current during the AC current unlatching process produces one source of acoustical noise alleviated through use of the DC current unlatching process.

In a preferred embodiment, because more energy is imparted to the actuator 118 when executing the AC current unlatching process than is imparted to the actuator 118 when executing the DC current unlatching process, the AC current unlatching process is able to unlatch the actuator 118 from the magnetic latch 134 when the DC current unlatching process is unable to unlatch the actuator 118 from the magnetic latch 134. However (as can be seen by a comparison of the DC current unlatch process acoustical noise response graphs of FIGS. 5 and 6, to the AC current unlatch process acoustical noise response graphs of FIGS. 7 and 8), the acoustical noise response of the DSD 100 to an execution of the DC current unlatch process is lower than the acoustical noise response of the DSD 100 to an execution of the AC current unlatch process. In a preferred embodiment, a reduction in acoustical noise of substantially 20% has been found between application of the DC current profile 162 at substantially 6.65 volts, and application of the AC current profile 178 at substantially 6.65 volts across the coil 122 of the same DSD 100.

Figure 5:
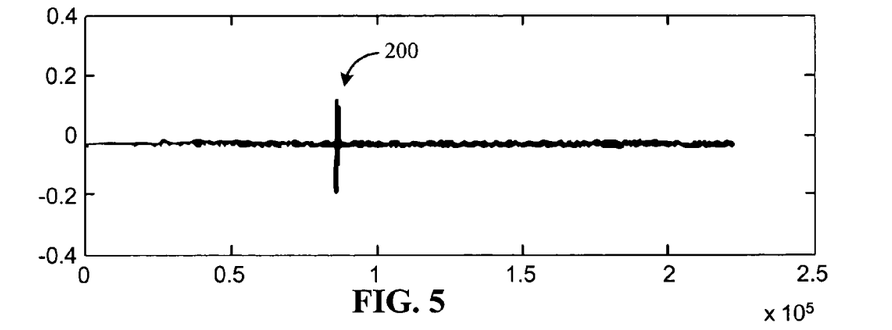
FIG. 5 is an acoustical noise graph showing the acoustical noise signal resulting from the use of the DC current unlatch process for unlatching the magnetic latch of the disc drive of FIG. 1.
Figure 6:
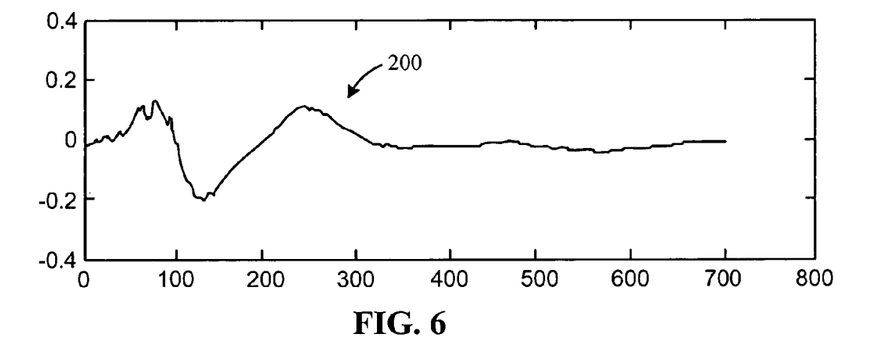
FIG. 6 is an expanded view of the noise signal of FIG. 5.

FIG. 5 shows an acoustical noise graph 200 resulting from an execution of the DC current profile 162 (of FIG. 3) across the coil 122 (of FIG. 1) at substantially 6.65 volts. FIG. 6 shows the same acoustical noise graph 200 at a resolution 10 times higher than the resolution of the acoustical noise graph 200 of FIG. 5.

Figure 7:
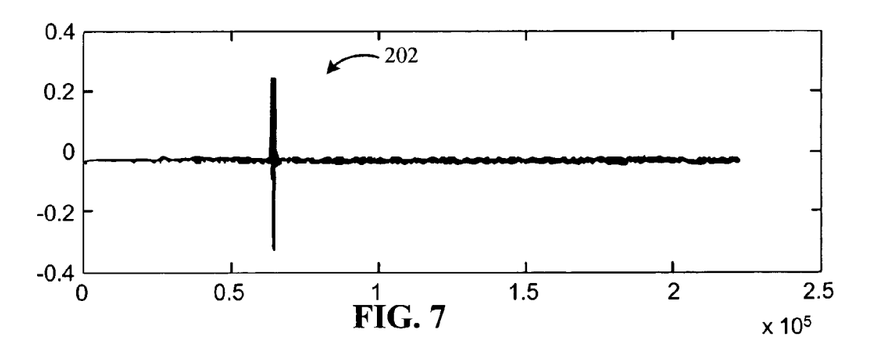
FIG. 7 is an acoustical noise graph showing the acoustical noise signal resulting from the use of the AC current unlatch process for unlatching the magnetic latch of the disc drive of FIG. 1.
Figure 8:
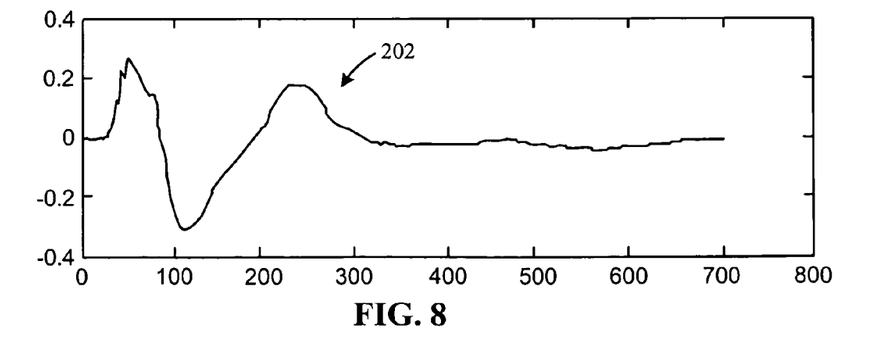
FIG. 8 is an expanded view of the noise signal of FIG. 7.

FIG. 7 shows an acoustical noise graph 202 resulting from an execution of the AC current profile 178 (of FIG. 4) across the coil 122 (of FIG. 1) at substantially 6.65 volts, while FIG. 8 shows the same acoustical noise graph 202 at a resolution 10 times higher than the resolution of the acoustical noise graph 202 of FIG. 7.

A comparison between FIGS. 6 and 8 shows that although the waveform of the noise graph 200 of FIG. 6 has a substantially similar waveform to the noise graph 202 of FIG. 8, the energy under the curve of the noise graph 200 is about 80% of the energy under the curve of the noise graph 202. In other words, the acoustical noise level that results from an execution of the DC current unlatch process is about 20% lower than the acoustical noise level that results from an execution of the AC current unlatch process.

Figure 9:
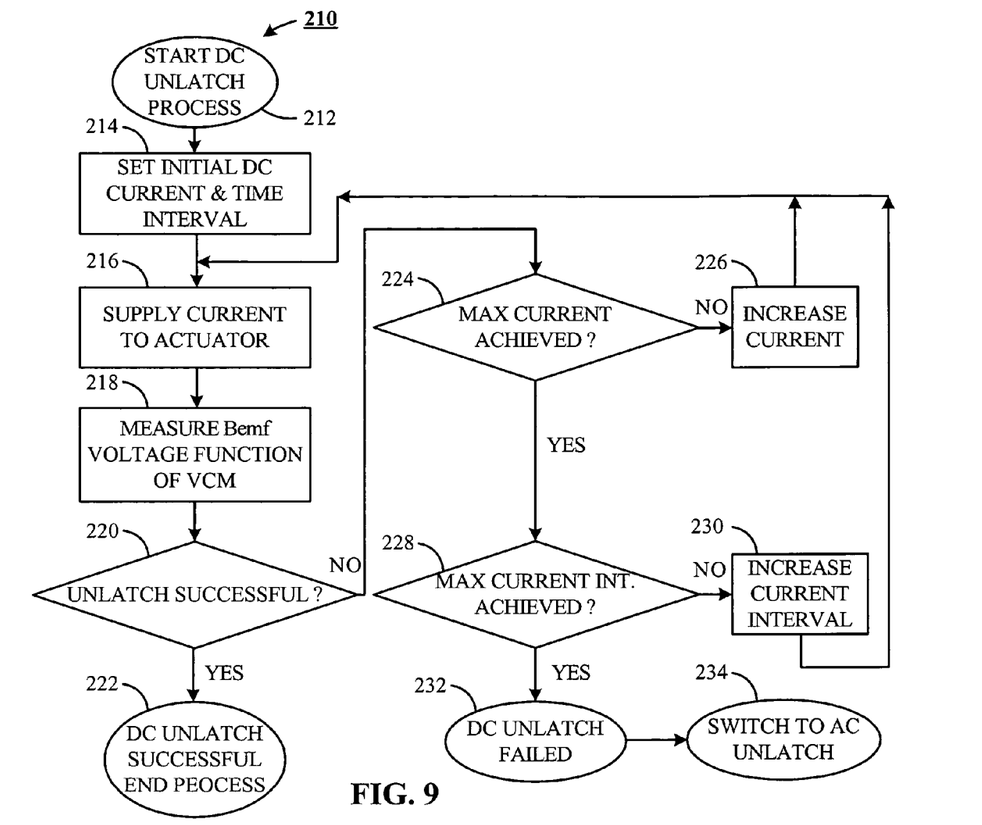
FIG. 9 is a flow chart of a DC current unlatch process used for unlatching the magnetic latch of the disc drive of FIG. 1.

FIG. 9 shows a DC current unlatch process 210 commencing at start DC unlatch process step 212 and continuing at process step 214. At process step 214, both an initial DC current and an initial time interval are selected. The initial DC current level applied over the initial time interval drives a coil (such as 122). In a preferred embodiment, both the initial time interval and the initial DC current are selected to be below their respective maximum current and maximum time interval levels. At process step 216, the initial DC current level is applied across the coil for the initial time interval. At process step 218, the back EMF (Bemf) voltage function of the coil is measured. At process step 220, if the measured Bemf voltage is a VCM sense voltage response (such as 176), the DC current unlatch process 210 has been successful, and the process concludes at DC unlatch successful end process step 222.

However, if at process step 220 the measured Bemf voltage function of the coil does not display the VCM sense voltage response, the DC current unlatch process 210 continues at process step 224. At process step 224, if the predetermined maximum current level has not been achieved, the DC current applied across the coil is increased at process step 226 and the process reverts to process step 216 and continues through the process to process step 220. At process step 220, if the unlatching process is still unsuccessful the process returns again to process step 224.

At process step 224, if a determination is made that the maximum current level has been attained, the process proceeds to process step 228. At process step 228, confirmation is made whether or not the maximum time interval for application of the maximum current level has been achieved. If the maximum time interval has not been achieved at process step 228, the process continues to process step 230. At process step 230, the time interval for application of the maximum current is increased, and the process reverts to process step 216. If the DC unlatch process is still unsuccessful, with the DC current set at its maximum level and applied across the coil for the maximum time interval, the DC current unlatch process 210 continues to DC unlatch failed process step 232, and then proceeds to AC unlatch process step 234.

Figure 10:
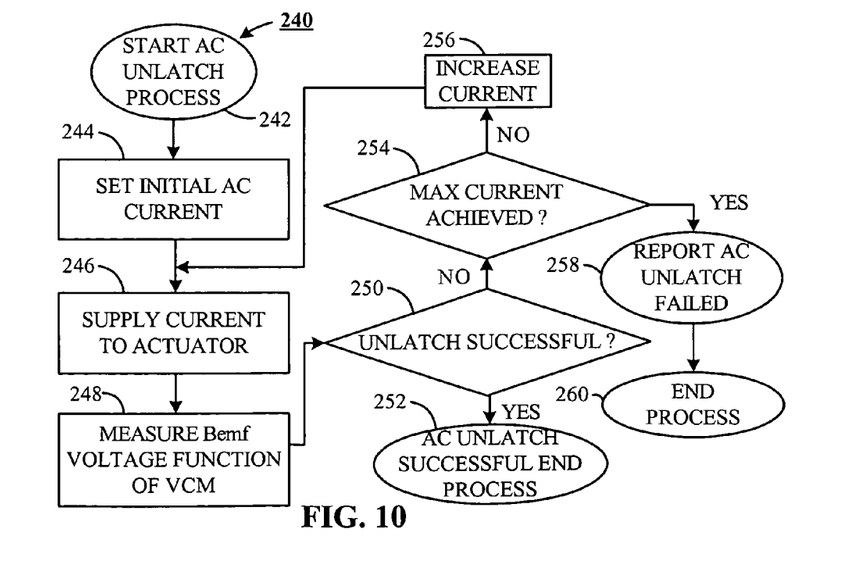
FIG. 10 is a flow chart of an AC current unlatch process used for unlatching the magnetic latch of the disc drive of FIG. 1.

FIG. 10 shows an AC current unlatch process 240 commencing at start AC unlatch process step 242 and continuing at process step 244. At process step 244, an initial AC current for use in driving a coil (such as 122) over a predetermined time interval is selected. In a preferred embodiment, the initial AC current is set below a maximum current level. The predetermined time interval remains substantially constant during execution of the AC unlatch process 240. At process step 246, the initial AC current level is applied across the coil for the predetermined time interval. At process step 248, the back EMF (Bemf) voltage function of the coil is measured. At process step 250, if the measured Bemf voltage is a VCM sense voltage response (such as 194), the AC current unlatch process 240 has been successful, and the process concludes at AC unlatch successful end process step 252.

However, if at process step 250 the measured Bemf voltage function of the coil does not display the VCM sense voltage response, the AC current unlatch process 240 continues at process step 254. At process step 254, if the predetermined maximum current level has not been achieved, the AC current applied across the coil is increased at process step 256 and the process reverts to process step 246 and continues through the process to process step 250. At process step 250, if the unlatching process is still unsuccessful the process returns again to process step 254.

At process step 254, if a determination is made that the maximum current level has been attained, the process proceeds to process step 258. At process step 258, the AC current unlatch process 240 reports the failure of the unlatch process and concludes at end process step 260.

Figure 11:
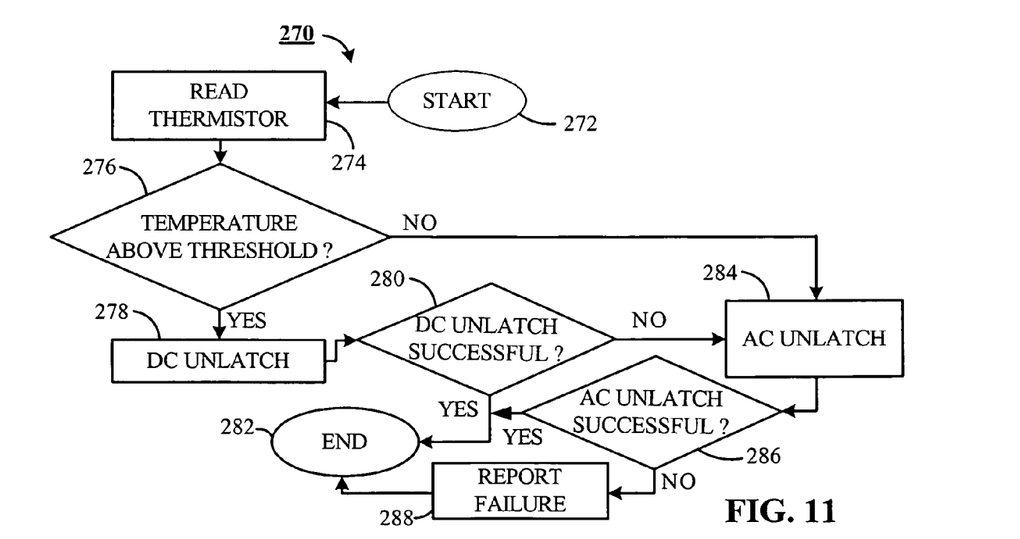
FIG. 11 is a flow chart of a temperature determined process used for unlatching the magnetic latch of the disc drive of FIG. 1.

The flowchart of FIG. 11 shows steps of an unlatch procedure 270 programmed into a controller (such as 148)

commencing at start step 272 and continuing at process step 274. At process step 274, an internal temperature of a HDA (such as 106) is determined by reading a resistance value of a thermistor (such as 142). At process step 276, a determination of whether or not the resistance value of the thermistor is greater than a predetermined temperature threshold value. If the resistance value of the thermistor is greater than the predetermined temperature threshold value, the unlatch procedure 270 proceeds to process step 278.

At process step 278, a DC current unlatch process (such as 210) is selected and executed. At process step 280, a determination is made of whether or not the DC unlatch process had been successful in unlatching an actuator (such as 118) from a magnetic latch (such as 134). If the DC unlatch process had been successful, the unlatch procedure 270 concludes at end process step 282.

However, if at process step 276 the resistance value of the thermistor is less than the predetermined temperature threshold value, or if at process step 280 the DC unlatch process is determined to have been unsuccessful, the unlatch procedure 270 proceeds to process step 284. At process step 284, an AC unlatch process (such as 240) is selected and executed.

At process step 286, a determination is made of whether or not the AC unlatch process had been successful in unlatching the actuator from the magnetic latch. If the AC unlatch process had been successful, the unlatch procedure 270 concludes at end process step 282. If at process step 286 the AC unlatch process is determined to have been unsuccessful, the unlatch procedure 270 proceeds to process step 288, reports an unlatch failure and proceeds to end process step 282.

The many features and advantages of the present invention are apparent from the written description. It is intended by the appended claims to cover all such features and advantages of the invention. As numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method comprising steps of:
   (a) determining an internal temperature of a device having an actuator and a latch configured to latch the actuator;
   (b) comparing the internal temperature to a predetermined threshold value;
   (c) initiating a DC current unlatch process for unlatching the actuator if the internal temperature is greater than the predetermined temperature threshold value; and in the alternative
   (d) initiating an AC current unlatch process for unlatching the actuator if the internal temperature is less than the predetermined temperature threshold value.

2. The method of claim 1, which the device is a head-disc assembly, and in which determining step (a) comprises:
   reading a thermistor to determine a value of the thermistor, wherein the value of the thermistor corresponds to the internal temperature of the head-disc assembly.

3. The method of claim 1, in which the latch is a magnetic latch, and in which the DC current unlatch process of step (c) further comprises steps of:
   (c)(1) selecting an initial DC current;
   (c)(2) applying the initial DC current across a coil of the actuator for an initial time interval;
   (c)(3) measuring a response of the coil to the initially applied DC current;
   (c)(4) determining whether the actuator has been successfully unlatched from the magnetic latch based on the response of the coil to the applied DC current;
   (c)(5) increasing incrementally the initial DC current to a predetermined maximum DC current level;
   (c)(6) measuring the response of the coil to each incremental increase in the initial DC current up to the predetermined maximum DC current level to determine whether the actuator has been successfully unlatched from the magnetic latch;
   (c)(7) expanding incrementally the initial time interval to a predetermined maximum time interval when the predetermined maximum DC current level applied across the coil for the initial time interval has been unsuccessful in unlatching of the actuator from the magnetic latch;
   (c)(8) evaluating the response of the coil to each incremental increase in the initial time interval up to the predetermined maximum time interval to determine whether the actuator has been successfully unlatched from the magnetic latch.

4. The method of claim 3, in which the AC current unlatch process of step (d) further comprises the steps of:
   (d)(1) selecting an initial AC current;
   (d)(2) applying the initial AC current across a coil of the actuator for a predetermined time interval;
   (d)(3) measuring a response of the coil to the initially applied AC current;
   (d)(4) determining whether the actuator has been successfully unlatched from the magnetic latch based on the response of the coil to the applied current;
   (d)(5) increasing incrementally the initial AC current to a predetermined maximum AC current level;
   (d)(6) measuring the response of the coil to each incremental increase in the initial AC current up to the predetermined maximum AC current level to determine whether the actuator has been successfully unlatched from the magnetic latch; and
   (d)(7) reporting an unlatch failure upon an unsuccessfully unlatching of the actuator from the magnetic latch.

5. The method of claim 3, further comprising a step of:
   (c)(9) switching to the AC current unlatch process when the predetermined maximum DC current level applied across the coil for the predetermined maximum, time interval has been unsuccessful in unlatching the actuator from the magnetic latch.

6. The method of claim 1, in which the latch is a magnetic latch, and in which the AC unlatch process of step (d) further comprises the steps of:
   (d)(1) selecting an initial AC current;
   (d)(2) applying the initial AC current across a coil of the actuator for a predetermined time interval;
   (d)(3) measuring a response of the coil to the initially applied AC current;
   (d)(4) determining whether the actuator has been successfully unlatched from the magnetic latch based on the response of the coil to the applied current;
   (d)(5) increasing incrementally the initial AC current to a predetermined maximum AC current level;
   (d)(6) measuring the response of the coil to each incremental increase in the initial AC current up to the predetermined maximum AC current level to determine whether the actuator has been successfully unlatched from the magnetic latch; and
   (d)(7) reporting an unlatch failure upon an unsuccessfully unlatching of the actuator from the magnetic latch.

7. The method of claim 1, in which the DC current unlatch process of step (c) further comprises steps of
(c)(1) determining whether the DC current unlatch process has successfully unlatched the actuator; and
(c)(2) initiating the AC current unlatch process of step (d) if the actuator has not been successfully unlatched.

8. A device comprising:
an actuator confined by a latch during period of inactivity;
a thermistor providing a value;
a controller responsive to the value of the thermistor selecting an unlatch process that unlatches an actuator of the device; and
an unlatch procedure programmed into the controller executing a DC current unlatch process if the thermistor value falls within a first range of predetermined values and art AC current unlatch process if the thermistor value falls within a second range of predetermined values.

9. The device of claim 8 in which the latch further comprises a magnetic latch configured to latch the actuator.

10. The device of claim 9, in which the unlatch procedure executes the selected unlatch process that unlatches the actuator from the magnetic latch.

11. The device of claim 8 further comprising a flex circuit supporting the thermistor, and in which the value of the thermistor is a resistance level of the thermistor, wherein the resistance level of the thermistor is indicative of a temperature adjacent the thermistor.

12. The device of claim 11, in which the temperature adjacent the thermistor is an internal temperature of a head-disc assembly of the data storage device.

13. A storage device combination comprising;
a base deck; and
an actuator supported by the base deck confined by a latch during periods of inactivity, and unlatched from the latch for periods of activity by steps for unlatching the actuator, the steps comprising:
(a) reading a thermistor to determine a value of the thermistor, wherein the value of the thermistor corresponds to the internal temperature of the data storage device;
(b) comparing the value of the thermistor to a predetermined temperature threshold value;
(c) initiating a DC current unlatch process when the value of the thermistor is greater than the predetermined temperature threshold value;
(d) validating success of the DC current unlatch process unlatching the actuator from the latch of the data storage device;
(e) activating an AC current unlatch process when the DC current unlatch process is unsuccessful in unlatching the actuator from the latch of the data storage device; and in the alternative
(f) commencing the AC current unlatch process when the value of the thermistor is less than the predetermined temperature threshold value.

14. The combination of claim 13, in which the latch is a magnetic latch, and in which the DC unlatch process comprises the steps of:
selecting an initial DC current;
applying the initial DC current across a coil of the actuator for an initial time interval;
measuring a response of the coil to the initially applied DC current;
determining whether the actuator has been successfully unlatched from the magnetic latch based on the response of the coil to the applied current
increasing incrementally the initial DC current to a predetermined maximum DC current level;
measuring the response of the coil to each incremental increase in the initial DC current up to the predetermined maximum DC current level to determine whether the actuator has been successfully unlatched from the magnetic latch;
expanding incrementally the initial time interval to a predetermined maximum time interval when the predetermined maximum DC current level applied across the coil for the initial time interval has been unsuccessful in unlatching of the actuator from the magnetic latch;
evaluating the response of the coil to each incremental increase in the initial time interval up to the predetermined maximum time interval to determine whether the actuator has been successfully unlatched from the magnetic latch; and
switching to the AC current unlatch process when the predetermined maximum DC current level applied across the coil for the predetermined maximum time interval has been unsuccessful in unlatching the actuator from the magnetic latch.

15. The combination of claim 14, in which the AC unlatch process comprises the steps of:
selecting an initial AC current;
applying the initial AC current across a coil of the actuator for a predetermined time interval;
measuring a response of the coil to the initially applied AC current;
determining whether the actuator has been successfully unlatched from the magnetic latch based on the response of the coil to the applied current;
increasing incrementally the initial AC current to a predetermined maximum AC current level;
measuring the response of the coil to each incremental increase in the initial AC current up to the predetermined maximum AC current level to determine whether the actuator has been successfully unlatched from the magnetic latch; and
reporting an unlatch failure upon an unsuccessfully unlatching of the actuator from the magnetic latch.

16. The combination of claim 13, in which the latch is a magnetic latch, and in which the AC unlatch process comprises the steps of:
selecting an initial AC current;
applying the initial AC current across a coil of the actuator for a predetermined time interval;
measuring a response of the coil to the initially applied AC current;
determining whether the actuator has been successfully unlatched from the magnetic latch based on the response of the coil to the applied current;
increasing incrementally the initial AC current to a predetermined maximum AC current level;
measuring the response of the coil to each incremental increase in the initial AC current up to the predetermined maximum AC current level to determine whether the actuator has been successfully unlatched from the magnetic latch; and
reporting an unlatch failure upon an unsuccessfully unlatching of the actuator from the magnetic latch.

* * * * *